(12) United States Patent
Akagawa

(10) Patent No.: US 7,341,036 B2
(45) Date of Patent: Mar. 11, 2008

(54) INTAKE DEVICE AND MOUNTING STRUCTURE OF VALVE UNIT

(75) Inventor: Masamichi Akagawa, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/498,201

(22) Filed: Aug. 3, 2006

(65) Prior Publication Data
US 2007/0028891 A1    Feb. 8, 2007

(30) Foreign Application Priority Data
Aug. 5, 2005    (JP)    ............................ 2005-228675

(51) Int. Cl.
F02D 9/10    (2006.01)
F02D 9/08    (2006.01)
F16K 1/22    (2006.01)

(52) U.S. Cl. ................. 123/184.53; 123/336; 123/337; 251/305

(58) Field of Classification Search ........... 123/184.53, 123/184.21, 184.61, 337, 336; 251/305, 251/308
See application file for complete search history.

(56) References Cited

U.S. PATENT DOCUMENTS 6,427,975 B1 *    8/2002    Powell ........................ 251/305
6,979,130 B1    12/2005    Stangier et al.
2007/0138693 A1    6/2007    Torii et al.
2007/0144483 A1    6/2007    Torii et al.

FOREIGN PATENT DOCUMENTS

| JP | 10-259768 | 9/1998 |
|----|-----------|--------|
| JP | 2007-40282 A | 2/2007 |
| JP | 2007-46470 A | 2/2007 |

OTHER PUBLICATIONS

U.S. Appl. No. 11/643,981, filed Dec. 22, 2006.

* cited by examiner

Primary Examiner—Stephen K. Cronin
Assistant Examiner—Hyder Ali
(74) Attorney, Agent, or Firm—Nixon & Vanderhye P.C.

(57) ABSTRACT

An intake device has an intake manifold, valve units each having a valve housing and a valve member, a shaft and deformed members. The intake manifold defines passages through which a fluid flows. Each of the valve units is disposed in a corresponding one of the passages of the intake manifold such that a passage of the valve unit is in communication with the passage of the intake manifold. The shaft passes through the intake manifold and the valve units, and rotatably supports the valve members. Further, each of the deformed members is disposed between the valve housing and the intake manifold and deformed therebetween.

12 Claims, 7 Drawing Sheets

INTAKE DEVICE AND MOUNTING STRUCTURE OF VALVE UNIT

CROSS REFERENCE TO RELATED APPLICATION

This application is based on Japanese Patent Application No. 2005-228675 filed on Aug. 5, 2005, the disclosure of which is incorporated herein by reference.

FIELD OF THE INVENTION

The present invention relates to an intake device for an engine and a mounting structure of a valve unit.

BACKGROUND OF THE INVENTION

For example, an intake device constructed of valve units and an intake manifold defining intake air passages is known. Each valve unit has a resinous valve member for switching a flow of intake air and a resinous housing. The valve member and the housing are integrated into a unit, and then mounted to the intake air passage of the intake manifold. This kind of intake device is for example disclosed in Japanese Patent Publication No. 2003-509634 (U.S. Pat. No. 6,979,130 B1).

In such an intake device, dimensional allowances are required between the valve member and the housing and between the housing and the intake manifold so as to reduce deformation of the housing and interference of the valve member with the housing after the valve unit is mounted to the intake manifold. Therefore, gaps exist between the valve member and the housing and between the housing and the intake manifold. As a result, even when the valve member is operated to a position to close the passage, intake air is likely to leak through the gaps. Further, the air leakage results in deterioration of engine performance.

Also, dimensional tolerances between the valve member, the housing and the intake manifold are absorbed by deformation of the housing. Therefore, axes of valve members are likely to be displaced among the plural valve members. In such a case, because the valve members of the plural valve units are supported by a single shaft so as to be driven simultaneously, the shaft is warped or deformed. This may cause an increase in torque of the shaft and operation errors.

SUMMARY OF THE INVENTION

The present invention is made in view of the foregoing matter, and it is an object of the present invention to provide an intake device and a mounting structure of a valve unit, which are capable of reducing a leakage of a fluid and ensuring stable operation of a valve member.

According to an aspect of the present invention, a valve unit has a valve housing defining a passage through which a fluid flows and a valve member disposed in the valve housing to open and close the passage. The valve unit is disposed in a passage member defining a passage through which a fluid flows. The valve member is disposed such that the passage of the valve housing is in communication with the passage of the passage member. A shaft is disposed to pass through the passage member and the valve unit such that the valve member is rotatably supported in the valve housing. A deformed member is disposed between the valve housing and the passage member. Further, the deformed member is deformed between the valve housing and the passage member.

As such, a dimensional tolerance between the valve unit and the passage member is absorbed by deformation of the deformed member. Namely, when the valve unit is arranged in the passage member, the dimensional tolerance between the valve unit and the passage member is absorbed since a member having flexibility is deformed. Therefore, deformation of the valve unit is reduced. Accordingly, the valve member can be stably operated in the valve housing.

In general, a clearance is defined between the valve member and the valve housing to ensure stable operation of the valve member. Since the deformation of the valve housing is reduced, the clearance can be reduced. Also, interference between the valve member and the valve housing can be reduced. Since the deformation of the valve housing is reduced, the valve unit can be mounted to the passage member with high accuracy. Therefore, a leakage of the fluid between the valve unit and the passage member is reduced.

The above structure can be applied to an intake device for an engine. The intake device has an intake manifold defining a plurality of passages and a plurality of valve units. Each valve unit is disposed in a corresponding one of the passages of the intake manifold. The plural valve members are supported by a single shaft. The deformed member is disposed and deformed between the corresponding valve unit and the intake manifold.

In this case, dimensional tolerances between the plural valve units and the intake manifold are reduced by the deformation of the deformed members. Further, displacement of the axes of the valve members among the plural valve units is reduced. Because positions of the axes of the plural valve members substantially coincide in the intake manifold, torque of the shaft will not be increased. Accordingly, the valve members can be stably operated.

Furthermore, since the deformation of the valve units is reduced, the valve member can be disposed in the valve housing with high accuracy. Thus, the leakage of an intake air between the valve member and the valve housing is reduced, and hence an engine performance improves.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

First Example Embodiment

Figure 1A:
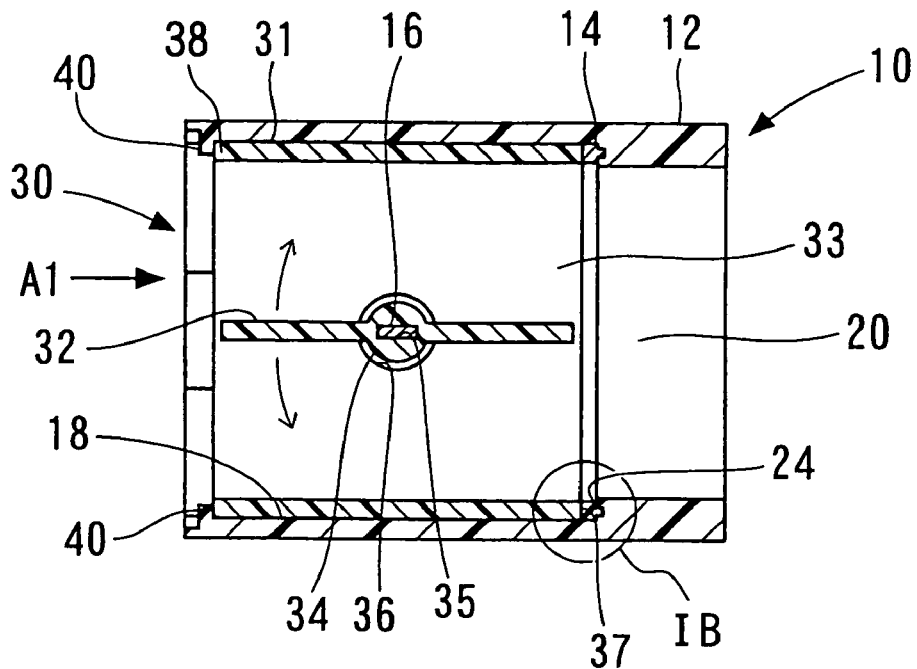
FIG. 1A is a cross-sectional view of an intake device, taken along a line IA-IA in FIG. 2, according to a first example embodiment of the present invention.

A first example embodiment of an intake device will be described with reference to FIGS. 1A to 5B. Although not illustrated, an intake device 10 shown in FIGS. 1A to 3 is for example disposed between a surge tank and an intake manifold. For example, intake air having passed through an air cleaner is drawn in the non-illustrated surge tank. The intake air flows from the surge tank into the non-illustrated intake manifold through the intake device 10. In FIG. 1, an arrow A1 denotes a flow direction of the intake air.

The non-illustrated intake manifold has plural intake air passages having different lengths. The intake device 10 distributes the intake air into the air intake passages of the non-illustrated intake manifold.

Figure 1B:
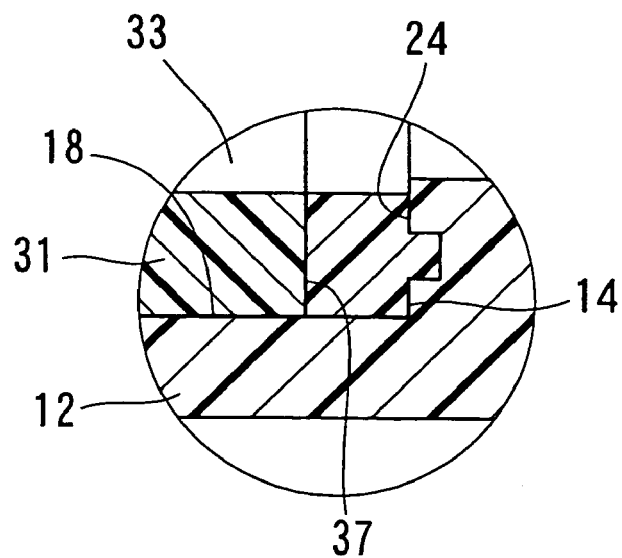
FIG. 1B is an enlarged view of a part of the intake device denoted by a circle IB of FIG. 1A.
Figure 2:
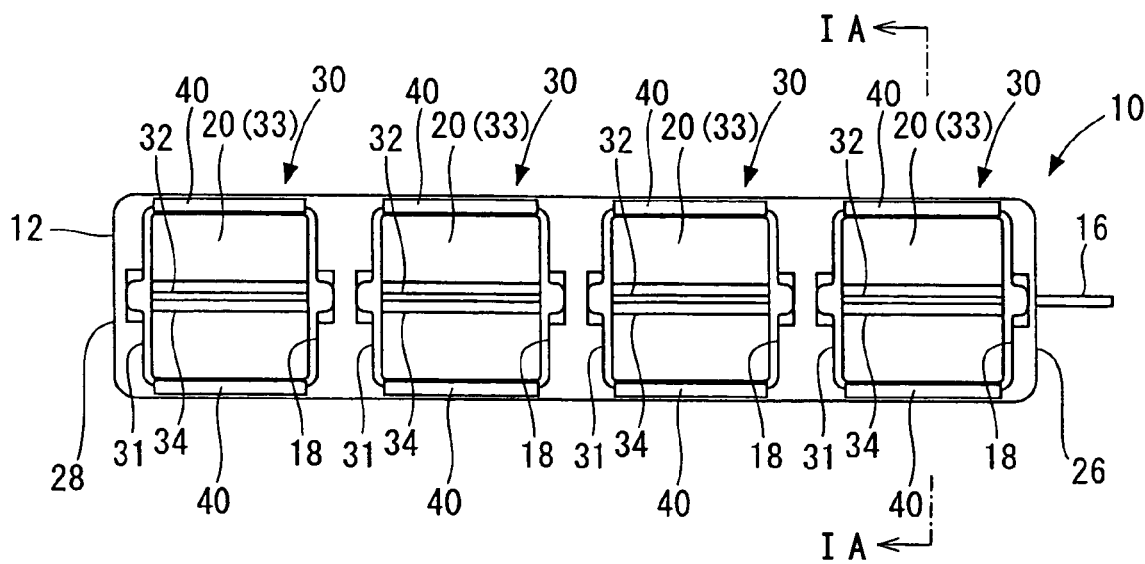
FIG. 2 is a front side view of the intake device according to the first example embodiment of the present invention.
Figure 3:
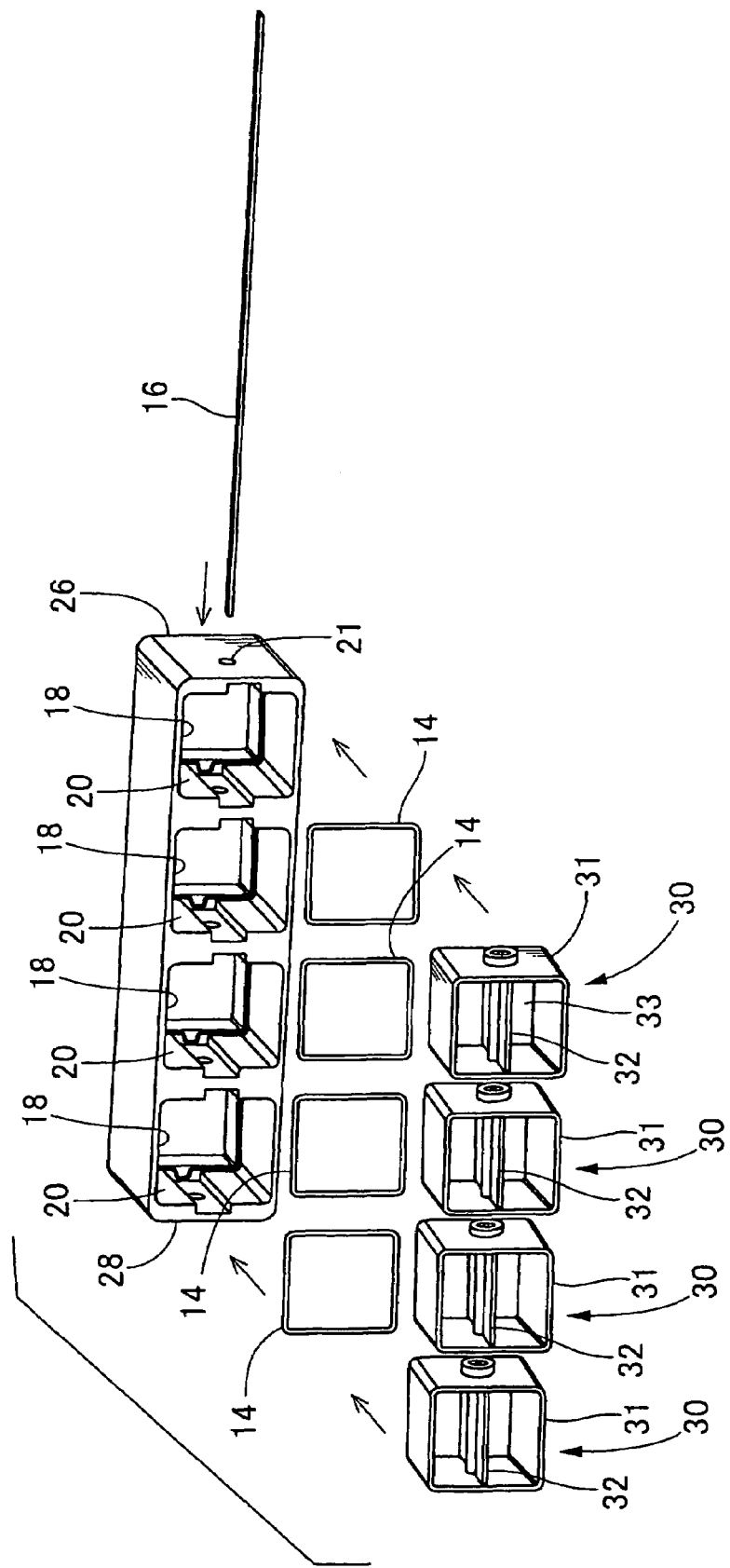
FIG. 3 is an exploded view of the intake device according to the first example embodiment of the present invention.

As shown in FIGS. 1A to 3, the intake device 10 has an intake manifold 12, valve units 30, sealing members 14 as deformed members, and a shaft 16. The intake manifold 12 is made of resin and forms plural housing chambers 18. Each of the housing chambers 18 forms a part of an air intake passage 20 that connects the surge tank and the non-illustrated intake manifold. The intake device 10 shown in FIG. 3 is for example used for an engine having four cylinders. Thus, the intake manifold 12 has four housing chambers 18 corresponding to four intake air passages 20.

Figure 4:
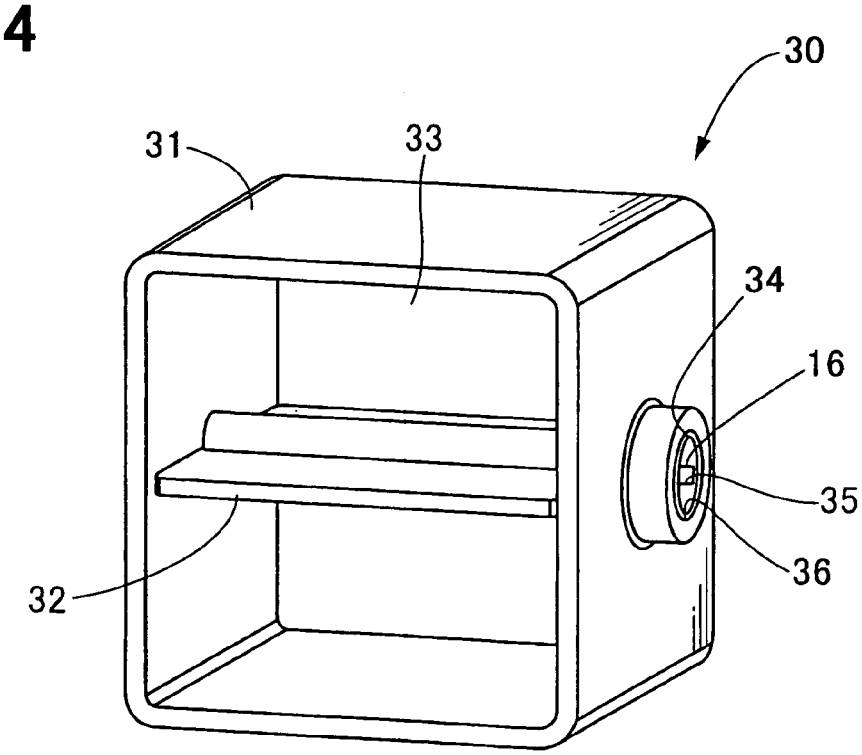
FIG. 4 is a schematic perspective view of a valve unit of the intake device according to the first example embodiment of the present invention.

As shown in FIGS. 1A and 2, each of the valve units 30 is housed in a corresponding one of the housing chambers 18. As shown in FIG. 4, each of the valve units 30 has a valve housing 30 and a butterfly member 32 as a valve member. The housing 31 has a tubular shape and defines a passage 33 therein.

For example, the housing chamber 18 has a substantially rectangular shape in a cross sectional plane defined perpendicular to an axis of the intake air passage 20. The valve housing 31 has a substantially rectangular shape in the cross sectional plane to correspond to the shape of the housing chamber 18. That is, the valve housing 31 is a tubular member having a substantially rectangular shaped cross-section.

The passage 33 forms a part of the intake air passage 20. Namely, the valve housing 31 is slightly smaller than the housing chamber 18 of the intake manifold 12. The valve housing 31 is housed in the housing chamber 18 such that the passage 33 is in communication with the intake air passage 20. Thus, the intake air drawn in the surge tank flows in the passage 33, as shown by the arrow A1 in FIG. 1A.

In the valve housing 31, the butterfly member 32 is rotatably supported by the shaft 16 so as to open and close the passage 33. For example, the housing 31 and the butterfly member 32 are made of resin.

As shown in FIGS. 1A and 4, the butterfly member 32 has a cylindrical portion 34. The cylindrical portion 34 extends in a direction perpendicular to an axis of the valve housing 31, at a substantially middle position of the butterfly member 32. Also, the cylindrical portion 34 projects from ends of the butterfly member 32 in a direction perpendicular to the axis of the valve housing 31. Further, the cylindrical portion 34 forms a shaft hole 35 therein through which the shaft 16 passes.

The valve housing 31 forms support holes 36 on side walls thereof. Ends of the cylindrical portion 34 are supported in the support holes 36 of the valve housing 31. Here, the ends of the cylindrical portion 34 have an outer diameter slightly smaller than an inner diameter of the support holes 36. As such, the butterfly member 32 is rotatably supported through the support holes 36 of the housing 31.

The shaft 16 passes through the intake manifold 12 and the plural valve units 30 in the direction perpendicular to the axes of the passages 33. Namely, the shaft 16 passes through shaft holes 21 formed on side walls 26, 28 of the intake manifold 12, as shown in FIG. 3. Further, the shaft 16 passes through the shaft holes 35 of the cylindrical portions 34 of all butterfly members 32. As such, the butterfly members 32 of all valve units 30 simultaneously rotate with the rotation of the shaft 16.

As shown in FIGS. 1A, 1B and 3, the sealing member 14 is arranged between the intake manifold 12 and each valve unit 30. Namely, the sealing member 14 is interposed between an inner wall of the intake manifold 12 and an outer wall of the valve unit 30.

For example, the sealing member 14 is interposed between a downstream end wall 37 of the valve housing 31 and an inner wall 24 of the intake manifold 12, in an axial direction of the passage 33. The inner wall 24 is opposed to the downstream end 37 of the housing 31 in the axial direction of the passage 33.

The sealing member 14 is made of a material having flexibility or elasticity against compression such as a gel rubber. However, a return force of the sealing member 14 after the compression is small. Namely, the elasticity of the sealing member 14 for returning to its original shape is small. In other words, the sealing member 14 substantially retains its deformed shape.

The sealing member 14 deforms between the valve housing 31 and the intake manifold 12 when it is arranged between the valve unit 30 and the intake manifold 12. Namely, the sealing member 14 deforms according to surfaces of the inner wall 24 of the intake manifold 12 and the end wall 37 of the valve housing 31. Further, while the sealing member 14 is flexibly deformed along the shape of the inner wall 24 of the intake manifold 12 and the end 37 of the housing 31, it substantially retains the deformed shape. Therefore, it is less likely that the sealing member 14 will generate bias forces toward the intake manifold 12 and the valve unit 30.

With the deformation, the sealing member 14 closely contacts the inner wall 24 of the intake manifold 12 and the end 37 of the housing 30. Further, the sealing member 14 is located downstream of the shaft 16 with respect to the flow direction A1 of the intake air. As such, the intake manifold 12 and the valve unit 30 are sealed by the sealing member 14. As a result, the intake air properly flows through the passage 33 of the valve housing 31 without leaking through a clearance between the intake manifold 12 and the valve unit 30.

Next, an assembling procedure of the intake device 10 will be described. The valve housing 31 and the butterfly member 32 are made of resin. Then, the valve housing 31 and the butterfly member 32 are integrated as into the valve unit 30.

The valve unit 30 is arranged in the housing chamber 18. The intake manifold 12 has four housing chambers 18, for example. Thus, four valve units 30 are arranged in the intake manifold 12. At this time, the sealing member 14 is arranged between the intake manifold 12 and the valve unit 30.

For example, the sealing member 24 is placed on the inner wall 24 of the intake manifold 12, the inner wall 24 defining the housing chamber 18. Then, the valve unit 30 is inserted in the housing chamber 18. As a result, the sealing member 24 is interposed between the intake manifold 12 and the valve unit 30.

Next, the shaft 16 is inserted to the intake manifold 12. For example, as shown in FIG. 3, the shaft 16 is inserted in the intake manifold 12 from one side 26 (e.g., right side in FIG. 3) to the opposite side 28 (left side in FIG. 3) through the shaft holes 21. Accordingly, the shaft 16 is disposed to pass through the intake manifold 12 and the butterfly members 32 of the valve units 30.

There may be dimensional tolerances between the intake manifold 12 and the valve units 30. For example, the flexible sealing members 14 can freely deform in three dimensional such as in the axial direction of the passage 33 and in directions perpendicular to the axial direction of the passage 33. Therefore, displacement of the valve units 30 with respect to the intake manifold 12 and displacement of the axes of the butterfly members 32 can be absorbed by the deformation of the sealing members 14.

Further, the sealing members 14 are made of the material that substantially retains the deformed shape. Therefore, the sealing members 14 do not largely produce bias forces against the deformation toward the intake manifold 12 and the valve units 30. It is less likely that the valve housings 31 and the shaft 16 will be deformed and bent when the valve units 30 are mounted to the intake manifold 12. As such, the butterfly members 32 will not interfere with the valve housings 31. The valve units 30 can be properly operated.

Further, each of the sealing members 14 can closely contact the inner wall 24 of the intake manifold 12 and the downstream end wall 37 of the valve unit 30. Therefore, the clearance between the intake manifold 12 and the valve unit 30 can be closed by the sealing member 14. Namely, the intake manifold 12 and the valve unit 30 are sealed.

After the shaft 16 is fixed in the intake manifold 12, the valve units 30 are fixed to the intake manifold 12. For example, an upstream end 38 of the valve housing 31, which is opposite to the downstream end 37, is fixed. As shown in FIG. 1A, an upstream end of the housing chamber 18 is bent toward the valve unit 30, thereby to form a fixing portion 40.

Figure 5A:
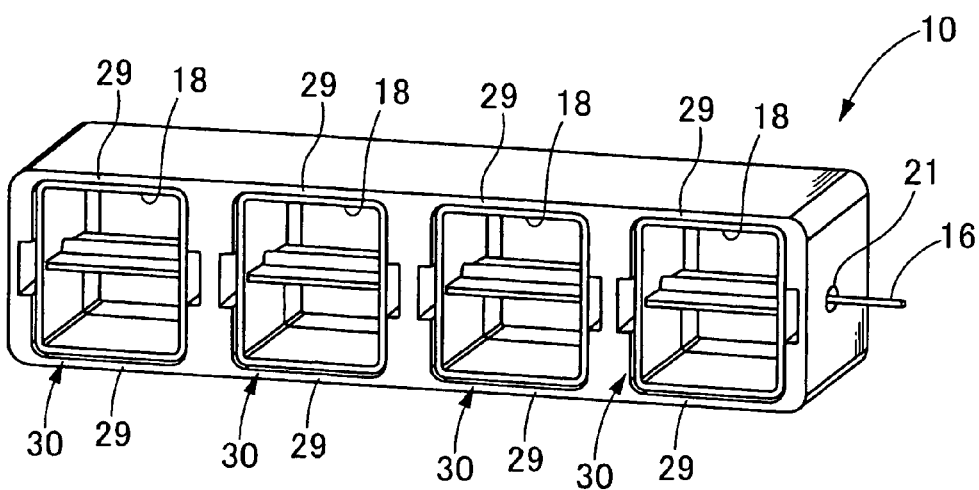
FIG. 5A is a schematic perspective view of the intake device before valve units are clamped to an intake manifold.
Figure 5B:
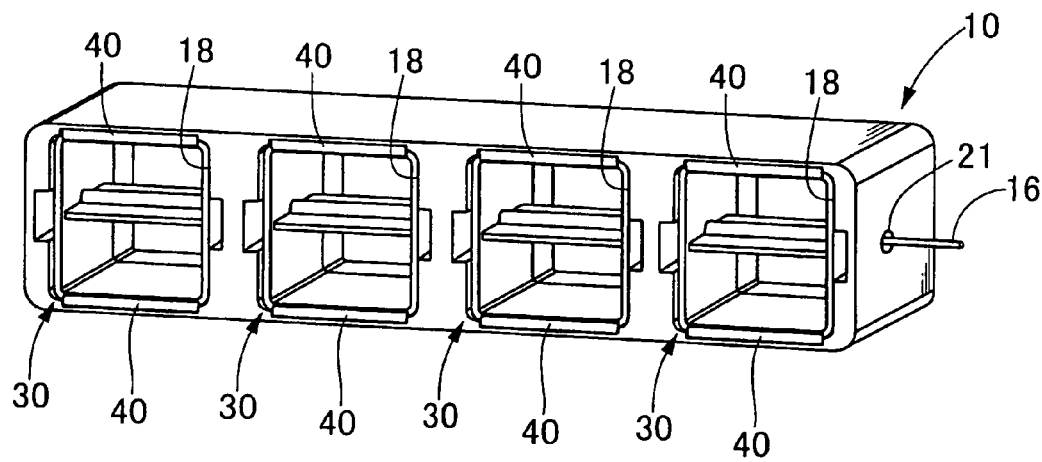
FIG. 5B is a schematic perspective view of the intake device when the valve units are fixed to the intake manifold by fixing portions.

In a condition that the valve units 30 are arranged in the housing chambers 18, an upstream end 29 of the manifold 12 projects from the upstream end 38 of the valve unit 30, as shown in FIG. 5. The upstream end 29 of the intake manifold 12 is heated and bent toward the valve unit 30. The fixing portions 40 are formed for each of the valve units 30. Thus, the valve units 30 are fixed by the fixing portions 40.

Accordingly, the valve units 30 are positioned with respect to the intake manifold 12 in accordance with the deformation of the sealing members 14. Further, the valve units 30 are fixed to the intake manifold 12 by the fixing portions 40.

Also, the sealing members 14, which lose resiliency once compressed and substantially retain the deformed shape, are disposed between the intake manifold 12 and the valve units 30. Therefore, the dimensional tolerances between the intake manifold 12 and the valve units 30 are absorbed in accordance with the deformation of the sealing members 14. As such, it is less likely that the valve housings 31 will be deformed while inserting in the housing chambers 18. Further, displacement of the valve units 30 with respect to the intake manifold 12 is absorbed by the deformation of the sealing members 14. As a result, interference between the housing 31 and the butterfly members 32 is reduced. Thus, the valve units 30 can be properly operated.

In addition, because the deformation of the valve units 30 are reduced, a clearance between the valve housing 31 and the butterfly member 32, which is formed for ensuring stable operation of the butterfly member 32, is reduced in each valve unit 30. As such, air leakage through the clearance between the housing 31 and the butterfly member 32 is reduced. Further, the air leakage between the intake manifold 12 and the valve units 30 is reduced by the sealing members 14. As a result, unnecessary air leakage is reduced in the intake air passages 20. This can make the performance of an engine stable.

Second Example Embodiment

Figure 6A:
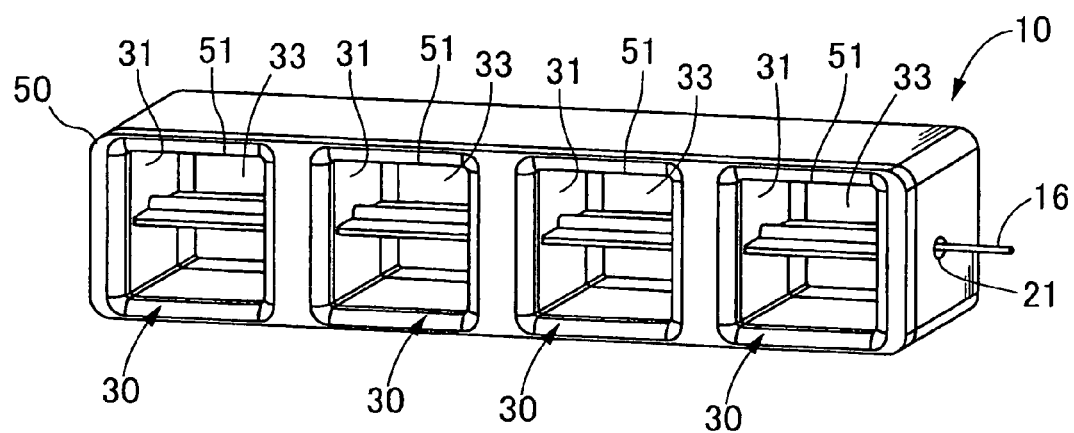
FIG. 6A is a schematic perspective view of an intake device according to a second example embodiment of the present invention.
Figure 6B:
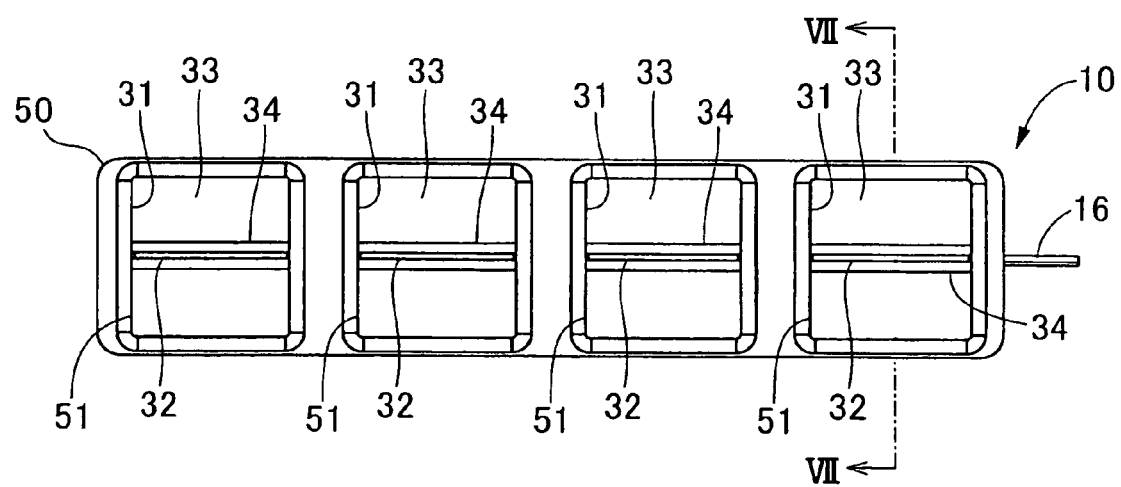
FIG. 6B is a schematic front side view of the intake device according to the second example embodiment of the present invention.
Figure 7:
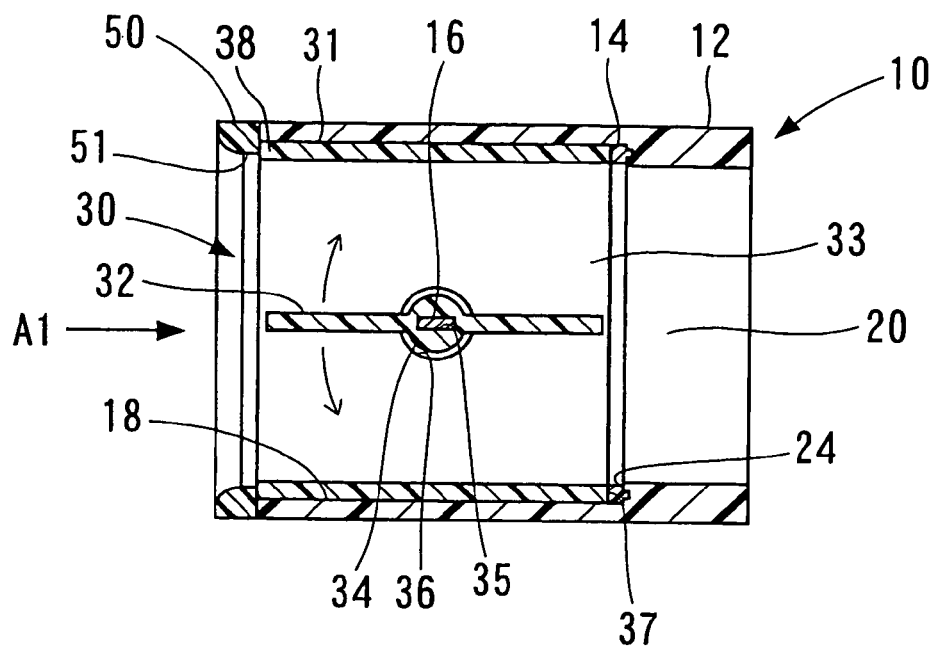
FIG. 7 is a cross-sectional view of the intake device taken along a line VII-VII in FIG. 6B.

A second example embodiment of the intake device 10 will be described with reference to FIGS. 6A, 6B and 7. Here, like components are denoted by like reference characters and a description thereof is not repeated. As shown in FIGS. 6A, 6B and 7, the intake device 10 has a cover plate 50, in place of the fixing portions 40 of the first example embodiment.

The cover plate 50 is disposed on an upstream end surface of the intake manifold 12, which is on a side opposite to the sealing member 14. The cover plate 50 has openings 51. Each of the openings 51 has a shape corresponding to the shape of each housing chamber 18 of the intake manifold 12. The cover plate 50 is made of resin. The cover plate 50 is fixed to the intake manifold 12 such as by thermal adhesion or welding.

Further, the cover plate 50 is fixed to the intake manifold 12 such that the upstream end 38 of each valve unit 30, which is on a side opposite to the sealing member 14, contacts the cover plate 50. Since the cover plate 50 is fixed to the intake manifold 12, the valve units 30 can be fixed to the intake manifold 12. Accordingly, in the second example embodiment, the valve units 30 are fixed to the intake manifold 12 by the cover plate 50, instead of the fixing portions 40 by the thermal clamping of the first example embodiment.

Since the cover plate 50 is provided as a member separate from the intake manifold 12, a shape of the cover plate 50 on a side opposite to the intake manifold 12 can be optionally changed. For example, the cover plate 50 can have a shape corresponding to a member that is to be coupled to the intake device 10. As such, the intake device 10 can be easily and properly coupled to the corresponding member. Further, the perimeter of the opening 51 can be formed into a round shape (R shape) so that flow resistance reduces.

Furthermore, an inner perimeter of the opening 51 can be formed to coincide with the inner shape of the upstream end 38 of the valve housing 31. Thus, air leakage between the valve housing 31 and the intake manifold 12 further reduces.

Other Modifications

In the first and second example embodiments, the intake device 10 are disposed directly downstream of the surge tank so that the intake air is introduced into the intake air passages of the non-illustrated intake manifold having the different lengths. Alternatively, the intake device 10 can be disposed at inlets of combustion chambers of the engine so that the intake air flow into the combustion chambers, that is, directions of tumble flows can be changed. Further, the arrangement position of the intake device 10 is not limited to the above.

In the above first and second example embodiments, the sealing member 14 is arranged between the downstream end wall 37 of the valve housing 31 and the inner wall 24 of the intake manifold 12. However, the position of the sealing member 14 can be modified.

Figure 8:
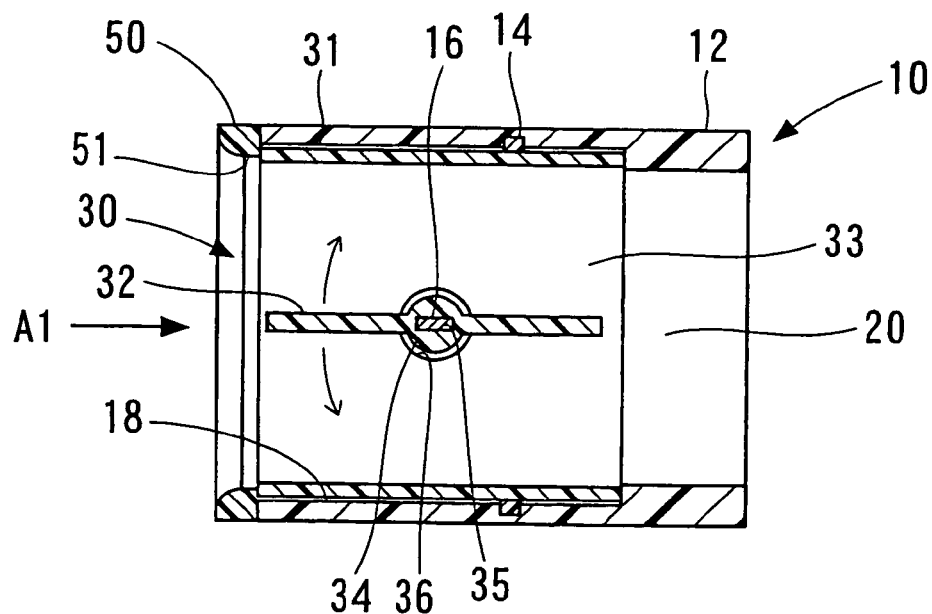
FIG. 8 is a cross-sectional view of an intake device according to a modification of the present invention.

For example, as shown in FIG. 8, the sealing member 14 can be arranged axially between the downstream end 37 and the upstream end 38 of the valve housing 31. In this case, the sealing member 14 is arranged between an outer peripheral wall of the valve housing 31 and an inner wall of the intake manifold 12 that is opposed to the outer peripheral wall of the valve housing 31.

Figure 9:
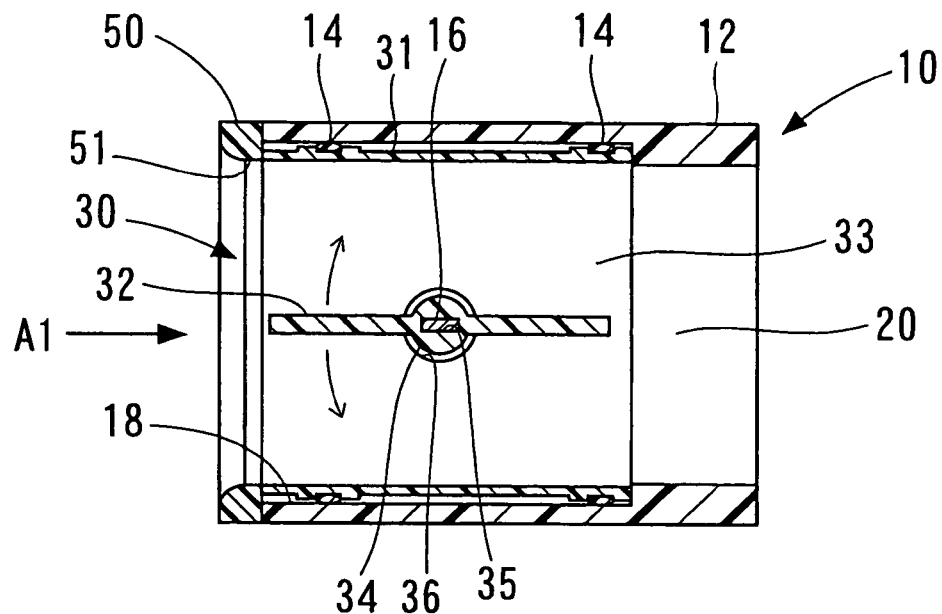
FIG. 9 is a cross-sectional view of an intake device according to another modification of the present invention.

Further, as shown in FIG. 9, plural sealing members 14 can be provided for each valve unit 30. For example, the sealing members 14 are arranged on opposite sides of the shaft 16 with respect to the axial direction of the valve housing 31, between the outer peripheral wall of the valve housing 31 and the inner wall of the intake manifold 12. In this case, the valve housing 31 is stably held with respect to the intake manifold 12. Therefore, the operation of the butterfly member 32 improves. Further, the sealing between the valve housing 31 and the intake manifold 12 improves.

Figure 10:
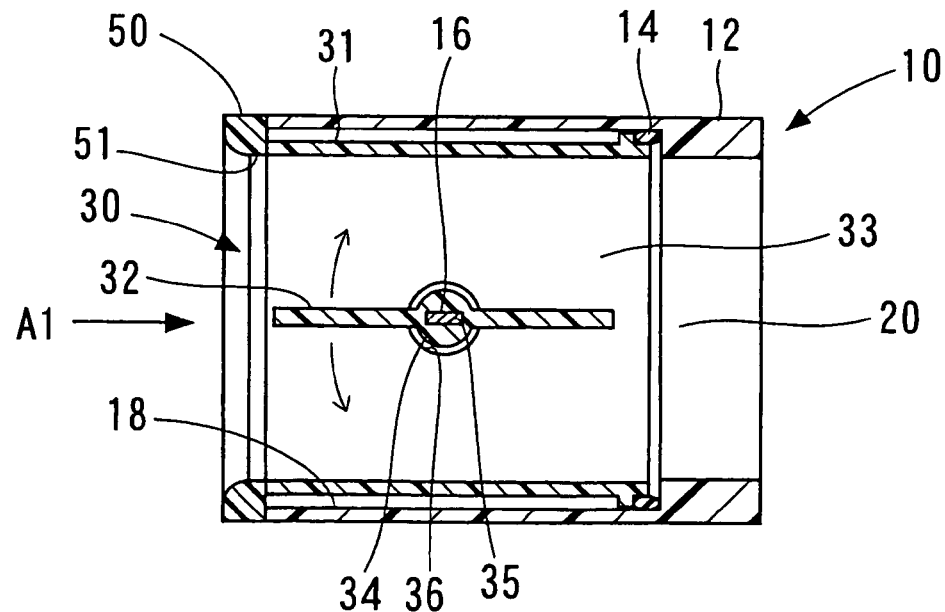
FIG. 10 is a cross-sectional view of an intake device according to further another modification of the present invention.

As shown in FIG. 10, the sealing member 14 can be arranged between the end of the housing 31 and the inner wall of the intake manifold 12 such that the sealing member 14 can be deformed in the axial direction of the housing and in a radial direction of the housing 31. As such, the housing 31 is stably held with respect to the intake manifold 12. Therefore, the operation of the valve 32 improves. Further, the sealing between the housing 31 and the intake manifold 12 improves.

In the above example embodiments, the intake device 10 exemplary has the four valve units 30 to be employed to the engine having the four cylinder. However, the number of the valve units 30 is not limited to four. The intake device 10 can be employed to an engine having two or more cylinders.

In the above example embodiments, the intake device 10 have the intake air passage 20 having substantially rectangular shaped cross section. However, the cross-sectional shape of the intake air passage 20 is not limited to the rectangular shapes. The intake air passage 20 can have another cross-sectional shape such as a circle or an ellipse.

Also, the arrangement of the intake device 10 is not limited to the above example embodiments. Further, in the first and second example embodiments, the sealing members 14 are disposed on the downstream position of the intake manifold 12 with respect to the flow direction A1 of the intake air and the fixing portions 40 or the cover plate 50 are disposed on the upstream position. However, the intake device 10 can be arranged in an opposite direction with respect to the flow direction A1.

Also, the fluid passing through the intake device 10 is not limited to the intake air.

Further, in the illustrated example embodiments, the housing chambers 18 are separately formed, and the number of the housing chambers 18 corresponds to the number of the valve units 30. However, it is not always necessary that each valve unit 30 is disposed in the corresponding housing chamber 18. For example, plural valve units 30 may be arranged in one housing chamber 18 as long as the intake air can be properly introduced and the valve housings 31 are stably held in the housing chamber 18.

Further, the above example embodiments can be implemented in various combinations.

The example embodiments of the present invention are described above. However, the present invention is not limited to the above example embodiments, but may be implemented in other ways without departing from the spirit of the invention.

What is claimed is:

1. An intake device comprising:
an intake manifold defining a plurality of passages through which a fluid flows;
a plurality of valve units, each valve unit having a valve housing that has a tubular shape and defines a passage therein and a valve member rotatably disposed in the valve housing to open and close the passage, each valve unit disposed in a corresponding one of the passages of the intake manifold such that the passage of the valve housing is in communication with the corresponding passage of the intake manifold;
a shaft disposed to pass through the intake manifold and the valve units and rotatably support the valve members; and
a plurality of deformed members, each deformed member disposed between a corresponding one of the valve housings and the intake manifold, wherein each deformed member is deformed between the valve housing and the intake manifold.

2. The intake device according to claim 1, wherein each deformed member is deformed according to shapes of a surface of the valve housing and a surface of the intake manifold.

3. The intake device according to claim 1, wherein the deformed member is disposed between an outer wall of the valve housing and an inner wall of the intake manifold.

4. The intake device according to claim 1, wherein the deformed member is disposed between an axial end wall of the valve housing and an inner wall of the intake manifold, the inner wall being opposed to the axial end wall of the valve housing in an axial direction of the valve housing.

5. The intake device according to claim 1, wherein the deformed member is disposed between an outer peripheral wall of the valve housing and an inner wall of the intake manifold.

6. The intake device according to claim 1, wherein the deformed member is made of a material that substantially retains its deformed shape.

7. The intake device according to claim 1, wherein the deformed member closely contacts an outer wall of the valve housing and an inner wall of the intake manifold to seal therebetween.

8. The intake device according to claim 7, wherein the deformed member is located downstream of the shaft with respect to a flow direction of the fluid in the passage of the valve housing.

9. The intake device according to claim 1, wherein the intake manifold has a fixing portion to fix an axial end of the valve housing.

10. The intake device according to claim 1, further comprising:
a cover plate fixed to an end of the intake manifold to fix the valve housings to the intake manifold.

11. The mounting structure comprising:
a passage member defining a passage through which a fluid flows;
a valve unit having a valve housing that defines a passage therein and a valve member disposed in the valve housing to open and close the passage of the valve housing, the valve unit disposed in the passage member such that the passage of the valve housing is in communication with the passage of the passage member;
a shaft disposed in the passage member such that the valve member is rotatable supported in the valve housing;
a sealing member disposed between the valve housing and the passage member, wherein the sealing member is deformed between the valve housing and the passage member and substantially retains its deformed shape; and
a plurality of valve units including the valve unit,
wherein the valve units are disposed in the passage member and the shaft is disposed to pass through the plurality of valve units.

12. The mounting structure according to claim 11, wherein the passage member defines a plurality of housing portions and the valve units are housed in corresponding housing portions.

* * * * *